(12) United States Patent
Channing (10) Patent No.: US 8,706,754 B2
(45) Date of Patent: Apr. 22, 2014

(54) SYSTEM AND METHOD FOR INTEGRATING KNOWLEDGE ENGINES IN A CLOUD COMPUTING ENVIRONMENT

(75) Inventor: Roger Joseph Channing, Fairfax Station, VA (US)

(73) Assignee: MicroTechnologies LLC, Vienna, VA (US)

( * ) Notice: Subject to any disclaimer, the term of this patent is extended or adjusted under 35 U.S.C. 154(b) by 32 days.

(21) Appl. No.: 13/360,282

(22) Filed: Jan. 27, 2012

(65) Prior Publication Data
US 2013/0198180 A1 Aug. 1, 2013

(51) Int. Cl.
*G06F 7/06* (2006.01)
*G06F 17/30* (2006.01)

(52) U.S. Cl.
USPC .......................... 707/769; 707/736; 707/706

(58) Field of Classification Search
None
See application file for complete search history.

(56) References Cited

U.S. PATENT DOCUMENTS

| | | |
|---|---|---|
| 2003/0028577 A1 | 2/2003 | Dorland et al. |
| 2004/0015891 A1 | 1/2004 | Arellano-Payne et al. |
| 2005/0021548 A1 | 1/2005 | Bohannon et al. |
| 2005/0086584 A1 | 4/2005 | Sampathkumar et al. |
| 2005/0150953 A1 | 7/2005 | Alleshouse |
| 2012/0151025 A1* | 6/2012 | Bailey et al. .................. 709/223 |
| 2013/0151980 A1* | 6/2013 | Lee et al. ...................... 715/738 |

OTHER PUBLICATIONS

Mell et al., "Draft NIST Working Definition of 'Cloud Computing'", Oct. 7, 2009.
International Search Report and Written Opinion for International Patent Application No. PCT/US2013/020726 dated May 14, 2013.

* cited by examiner

*Primary Examiner* — Bruce Moser
(74) *Attorney, Agent, or Firm* — Thompson Coburn LLP (57) ABSTRACT

The present invention is a system for integrating knowledge engines in a cloud computing environment, having a cloud computing platform, a graphical user interface (GUI), several applications for integrating information, knowledge engines for extracting knowledge from data and information, and an index consisting of an index engine, an index database, and a connector to several data sources. The present invention also includes a method of integrating knowledge engines in a cloud computing environment.

20 Claims, 9 Drawing Sheets

SYSTEM AND METHOD FOR INTEGRATING KNOWLEDGE ENGINES IN A CLOUD COMPUTING ENVIRONMENT

RELATED APPLICATION

This application is related to U.S. patent application Ser. No. 13/360,157, filed Jan. 27, 2012 and titled "TRANSPORTABLE PRIVATE CLOUD COMPUTING PLATFORM AND ASSOCIATED METHOD OF USE" which is hereby expressly incorporated by reference herein in its entirety.

FIELD OF INVENTION

The present invention generally relates to cloud computing and more specifically to systems and methods for integrating knowledge engines in a cloud computing environment.

BACKGROUND OF THE INVENTION

The collection and transformation of data and information from the Internet and social media into knowledge is a daunting challenge for system developers. "Information" is organized or structured data, whereas "knowledge" is the synthesis of multiple sources of information over time. Much of the difficulty in synthesizing multiple sources of data and information into knowledge is the inherent characteristics of the Internet and social media. Data and information are often unorganized, multi-modal, and distributed over server sites all over the world. The number and variety of data and information sources is constantly increasing. The same piece of data or information can often be accessible from many different data sources and in different formats. Data and information are often ambiguous and sometimes erroneous. Finally, some data and information are not consistently available for integration. For these reasons, the transformation from data and information into knowledge is not an easy task.

Search engines and related technologies fall short of transforming data and information into knowledge. Search engines do not possess a reasoning capability and as a result they return a great deal of irrelevant data and information. The step of filtering that data and information based on meaningful heuristics is left to the human operator. Search engines are not well-equipped to handle ambiguity and imprecise searches yield unexpected results.

Semantic computing engines, or knowledge engines, introduce reasoning to the data and information retrieval process. Knowledge engines employ machine learning algorithms to understand the intentions of users, and convert those intentions into machine-level search instructions. In addition, knowledge engines employ machine learning algorithms to understand the retrieved content, regardless of its form. Knowledge engines are capable of mapping the semantics of a particular user with various types of content.

A problem with existing knowledge engines is that they are often domain-specific and are based on different ontologies. The knowledge engines are not integrated and there is no seamless and coherent user interface.

Cloud computing systems and methods have been developed to provide dynamically scalable resources that can be allocated as a service to users over a network. An advantage of building a knowledge engine integration system on a cloud computing system is the abstraction of both physical resources and software implementations from the user. In addition, the interfaces between the knowledge engines and the disparate data and information sources can be managed through the cloud. For example, a user is only required to log into a cloud instance to have access to a multitude of data and information sources.

The present invention is directed to overcoming one or more of the problems set forth above.

SUMMARY OF INVENTION

This section provides a general summary of the disclosure and is not a comprehensive disclosure of its full scope or all of its features. The present invention is directed at the next new innovation in knowledge environments, creating the fusion of knowledge-related tools to discover, capture, and share information that results in the creation of new knowledge by relating seemingly disparate, unconnected pieces of information.

An aspect of this invention provides a system for integrating knowledge engines in a cloud computing environment that includes a cloud computing platform for hosting knowledge engines and integration software; a graphical user interface, hosted on the cloud computing platform, for interfacing with a user; a plurality of applications, hosted on the cloud computing platform and accessible through the graphical user interface, for integrating output from knowledge engines; at least one knowledge engine, interfaced with the plurality of applications, for extracting knowledge from data and information; at least one index database, accessible by the at least one knowledge engine, for storing indexing information; at least one index engine, interfaced with the at least one index database, for retrieving and indexing data and information from a plurality of data sources; and at least one connector per each index engine, for transferring data and information between the at least one index engine and the plurality of data sources.

An aspect of this invention provides a method of integrating knowledge engines in a cloud computing environment, which includes activating a graphical user interface (GUI) for a knowledge integration system, wherein the graphical user interface (GUI) is hosted on a cloud computing platform; presenting a set of knowledge integration system options to the user; selecting knowledge integration system options; starting the knowledge integration system; presenting a set of application options to the user; selecting an application from the set of application options; resourcing a configuration of software sufficient to run the selected application; selecting an appropriate user interface for the selected application; selecting at least one dynamic engine appropriate for the selected application; and selecting an index, wherein the index is comprised of at least one index engine, at least one index database, and at least one connector per each index engine, appropriate for the selected application.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

Reference characters in the written specification indicate corresponding items shown throughout the drawing figures.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as to obscure the present invention.

Figure 1:
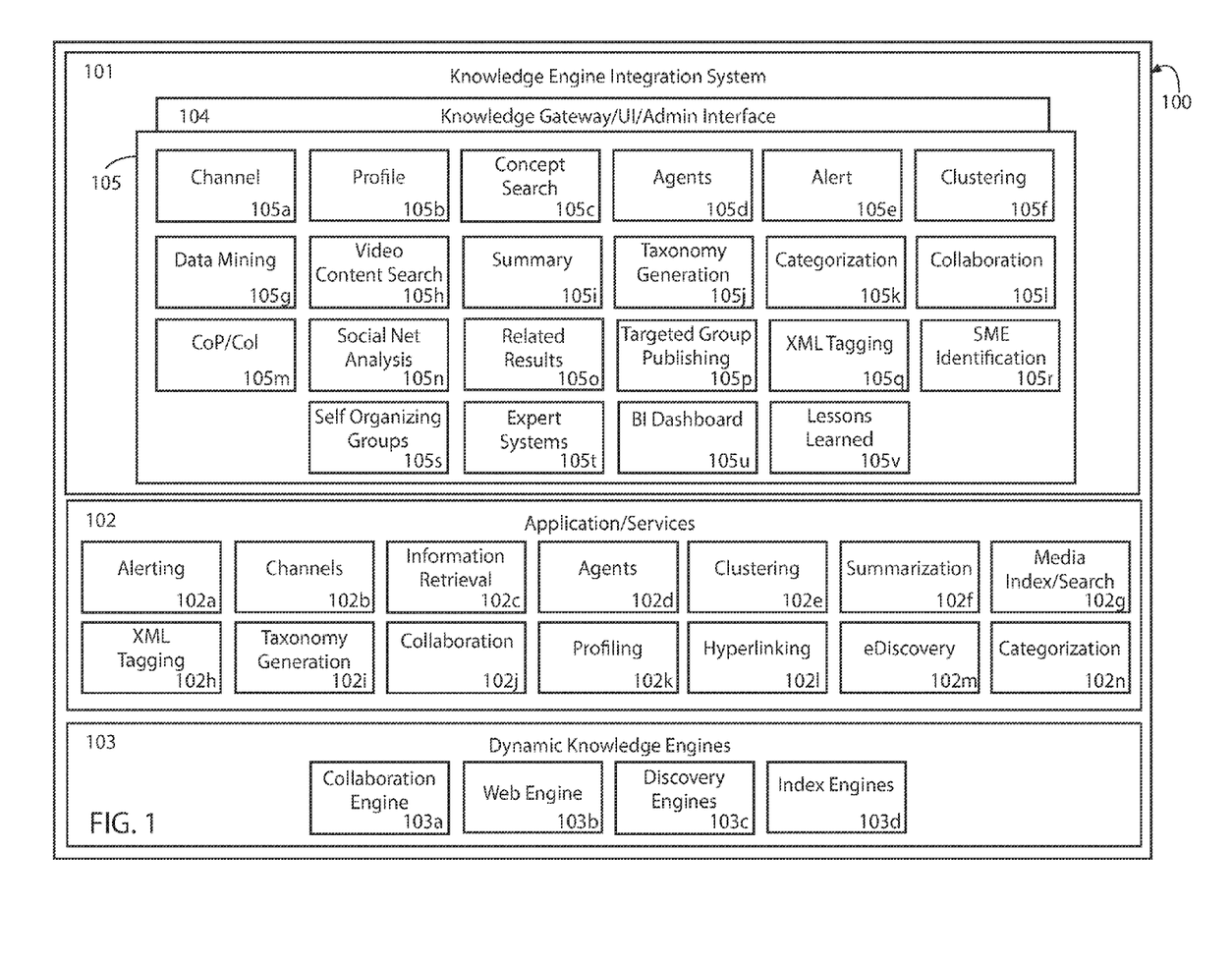
FIG. 1 shows an architecture diagram of the knowledge engine integration system in accordance with the present invention.

An illustrative, but nonlimiting, embodiment of the knowledge engine integration system 100 is shown in the architecture diagram of FIG. 1, which resides on at least one of a plurality of processors. A processor can include any of a wide variety of computers, servers, laptops, desktops, and so forth. The knowledge engine integration system 100 provides a state-of-art, self-contained knowledge fusion capability leveraging the integration of several leading edge technologies, including advanced federated search, advanced discovery, social mining, video index and search, concept search, indexing, portal, and collaborative knowledge tools. The knowledge engine integration system 100 enables a system administrator or user with little or no technical cloud or search experience to fully implement, administer, and manage a knowledge engine integration system 100. The knowledge engine integration system 100 is an ideal research tool that provides content and process capability searching thousands of sources and documents quickly. The knowledge engine integration system 100 has the ability to interface with electronic tablets as well as various handheld and smart phone interfaces. Through the knowledge engine integration system 100, knowledge is generated, pushed, and pulled to and from a knowledge environment.

The knowledge engine integration system 100 is comprised of three layers, the knowledge gateway/user interface ("UI")/admin interface layer 101, the applications/services layer 102, and the dynamic knowledge engines layer 103.

The knowledge gateway/UI/admin interface layer 101 is designed to provide an intuitive customized user interface, depicted as the knowledge gateway/UI/admin interface 104, allowing the user to seamlessly leverage all of the power of the integrated applications, indexes, and dynamic knowledge engines. The knowledge gateway/UI/admin interface 104 manages all of the knowledge fusion capabilities that are brought together in the present invention. The knowledge gateway/UI/admin interface 104 brings together multiple disparate systems into a self-contained integrated knowledge solution that is easily implemented, managed, and used as a single user interface. The knowledge gateway/UI/admin interface 104 is a customizable interactive knowledge portal that is client-focused and tailored to the needs of the user.

The knowledge gateway/UI/admin interface 104 has a multitude of functional components 105, depicted in FIG. 1 as 105a through 105v. Each of the multitudes of functional components 105 may be built into the knowledge gateway/UI/admin interface 104 or they may be interfaced to corresponding applications or services in the applications/services layer 102. The multitude of functional components 105 of the knowledge gateway/UI/admin interface 104 are not limited to those shown in FIG. 1.

In the channel component 105a, relevant information is automatically fed into a set of hierarchical channels. Channel hierarchies are customized and can be edited by the users. These channels can be tied to the taxonomy generation 105j.

The profile component 105b allows for profiling of users using search results, agents, and biographical materials on users. The profile component 105b has the ability to monitor the way users interact with information and form profiles of their interests. These profiles are then used to alert users to existing material, and where appropriate, deliver highly relevant new information.

The concept search component 105c, or conceptual search, is an automated information retrieval method that is used to search electronically stored unstructured text such as digital archives, email, and scientific literature. The concept search component 105c searches for information that is conceptually similar to the information provided in a search query. In other words, the ideas expressed in the information retrieved in response to a concept search query are relevant to the ideas contained in the text of the query.

The agents component 105d is custom designed using natural language to find knowledge of interest to the user. The agents component 105d will crawl the index and bring the information back to the user on demand or provide an alert to the user when new information arrives. The agents component 105d has the ability to monitor information on Internet sites, news feeds, chat streams, and internal repositories and alert users to information that is relevant to their specific interests. The agents component 105d can be trained until it accurately finds relevant information and alerts the user to new results as they are found.

The alert component 105e has automatic alerting facilities to allow users to be instantly alerted to new pertinent content. The alert component 105e allows the user to receive personalized alerts from various tools and agents about information that the user determines relevant.

The clustering component 105f automatically clusters data and information based on an understanding of its content. This information can then be displayed as a cluster of knowledge or as knowledge over time. Graphic representations of knowledge and knowledge relationships are generated by clustering like concepts and monitoring the clusters across time. This graphical representation provides an overall snapshot of the knowledge environment and allows for the management and focusing of indexing resources for the environment.

The data mining component 105g allows for the discovery of new patterns to be created from large data and information sets. The data mining component 105g works with the clustering component 105f to add intelligence to clusters of data and information.

The video content search component 105h offers the capability to capture, search, and index video, archival as well as live streaming, while simultaneously producing a transcript, if necessary.

The summary component 105i provides the capability of deriving a summary of a document's content. This summary can be displayed as the initial sentences in the document or as an intelligent summary of the document's contents.

The taxonomy generation component 105j provides an information landscape, allowing users to see the spread and type of information retrieved and indexed.

The categorization component 105k provides for an automatic categorization of data without the need for manual intervention and provides a capability for focusing search and discovery. Categories can also be imported from existing XML files and legacy topics.

The collaboration component 105l provides the ability to automatically analyze users' explicit interest and implicit profiles to create virtual groups of interest or identify experts. The collaboration component 105l provides an environment that allows the users to share data, documents, and even video or audio files. This environment is interactive and allows the sharing of tacit to tacit knowledge in real time.

The CoP/CoI component 105m is a collaborative engine application that provides a sharing environment. The CoP/CoI component 105m provides the ability to create Communities of Practice (CoP) or Communities of Interest (CoI) to facilitate sharing of best practices, lessons learned, whiteboarding, and performance support.

The social net analysis component 105n allows for social media mining and analysis with specific focus on "Sentiment Analysis" and "Reputation Analysis." These features enable users to discover real-time what is being said about their enterprise, proactively engage with the public/client base, and obtain near real-time feedback (both positive and negative) from multiple social media tools cutting across the social networking spectrum. Brand assessment and protection is also an important capability of the social net analysis component 105n.

The related results component 105o allows for a federated search capability that fuses all knowledge sources and search engines into one integrated interface. The search capability indexes and searches involving structured, semi-structured, and unstructured data as well as audio, "RSS Aggregation," and video content search. The search is better focused with an organic retraining function used to search results.

The targeted group publishing component 105p is a capability of focusing customized knowledge on a specific group of people within a knowledge domain at which the message is aimed. This provides relevant knowledge to users quickly and efficiently.

The XML tagging component 105q tags phrases and numeric values in documents automatically when the document is indexed into the system. This precludes or reduces the requirement for manual meta tagging of documents.

The SME identification component 105r allows for identification of subject matter experts (SME). The SME identification component 105r provides a capability to find human capital assets by searching several profiles, bios, and materials across the organization with specific and/or general skills needed by an individual or organization.

The self-organizing groups component 105s allows self-organizing groups to be formed by profiling users and identifying common threads and interests for forming collaboration environments. The self-organizing groups component 105s also has a blogs/Wiki capability as well as the index and search capability. The self-organizing groups component 105s includes the capability of creating threaded discussions, synchronous collaboration, and shared workspaces.

The expert systems component 105t allows much of the system knowledge to be automated by intelligent wizards/expert systems to reduce the impact on the user.

The business intelligence dashboard component 105u is an important part of the overall environment that assists in knowledge management (KM), trend forecasting, and development of predication models.

The lessons learned component 105v, or knowledge acquisition capability, creates a lessons learned archive that can be automatically developed to be indexed and searchable.

The applications/services layer 102 consists of a multitude of applications and/or services, shown in FIG. 1 as 102a though 102n. The software components of the applications/services layer 102 have been brought together in order to provide a myriad of unprecedented capabilities for the knowledge engine integration system 100. The software components of the applications/services layer 102 are not limited to those shown in FIG. 1. The following list enumerates the software components of the applications/services layer 102 shown in FIG. 1, along with their capabilities.

102a—Alerting

Automatic alerting facilities allow users to be instantly alerted to new pertinent content.

102b—Channels

Relevant information is automatically fed into a set of hierarchical channels. Channel hierarchies are customized and can be edited by the users. These channels can be tied to an organization's taxonomy.

102c—Information Retrieval

Information Retrieval supports a wide range of retrieval methods, from simple legacy keyword search to highly sophisticated conceptual querying. Information retrieval includes the capability to index and search structured, unstructured, and semi-structured data as well as audio and video content retrieval.

102d—Agents

Intelligent agents are custom designed using natural language to find knowledge of interest to the user. The agents will crawl the index and bring the information back to the user on demand or alert the user when new information arrives. It provides the ability to monitor information on Intranet and Internet sites, news feeds, chat streams, and internal repositories, and alert users to information that is relevant to their specific interests.

102e—Clustering

This capability automatically clusters information, based on an understanding of its content. This information can then be displayed as a cluster of knowledge or as knowledge over time.

102f—Summarization

A summary of a document's content will be derived automatically. This summary can be displayed as the initial sentences in the document or as an intelligent summary of the document's contents.

102g—Media Index and Search

Automatically extracts and forms concepts and contextual meaning of the media. Media content can be found, reused, and understood as easily as text, and automatically compared to other forms of relevant information.

102h—XML Tagging

Phrases and numeric values in documents are automatically tagged when the document is indexed into the system.

**102*i*—Taxonomy Generation**
Taxonomy generation feature provides an "information landscape," allowing users to see the spread and type of information.

**102*j*—Collaboration**
Collaboration provides the ability to automatically analyze users' explicit interest and implicit profiles to create virtual groups of interest or to identify experts. Collaboration provides an environment that allows the users to share data, documents, video, and/or audio files. This environment is interactive and allows the sharing of tacit to tacit knowledge in real time.

**102*k*—Profiling**
Profiling provides the ability to monitor the way in which users interact with information and automatically form profiles of their interests. These profiles are then used to alert users to existing material, and where appropriate, deliver highly relevant new information.

**102*l*—Hyperlinking**
Automatic hyperlinks connect users to a range of pertinent documents, services, or products that are contextually linked to the original text.

**102*m*—E-Discovery**
E-Discovery provides the ability to analyze and categorize electronic discovery data and information that is gathered in preparation for a litigation.

**102*n*—Categorization**
Categorization provides for an automatic categorization of data without the need for manual intervention and provides a capability of focusing search and discovery. Categories can also be imported from existing XML files or legacy topics.

The dynamic knowledge engines layer 103, shown in FIG. 1, contains several engines that are the object of the knowledge engine integration system 100. The knowledge engine integration system 100 is powered by these advanced search and discovery engines. The engines are next generation search and discovery tools, enabling a concept level search as opposed to the traditional keyword search, finding data relationships in data in addition to data retrieval, and establishing semantic meaning which far surpasses the limitations of traditional keyword search systems. Likewise, meta-tagging is not required, thus reducing manpower and labor required to perform targeted search activities. These integrated knowledge engines enable the ability to both connect to and search discrete databases and make relevant connections among seemingly unrelated data.

FIG. 1 shows a collaboration engine 103*a*, a web engine 103*b*, a discovery engine 103*c*, and an index engine 103*d*. The interaction between these different engines of the dynamic knowledge engines layer 103 is shown in a preferred, but nonlimiting, embodiment in FIG. 2.

Figure 2:
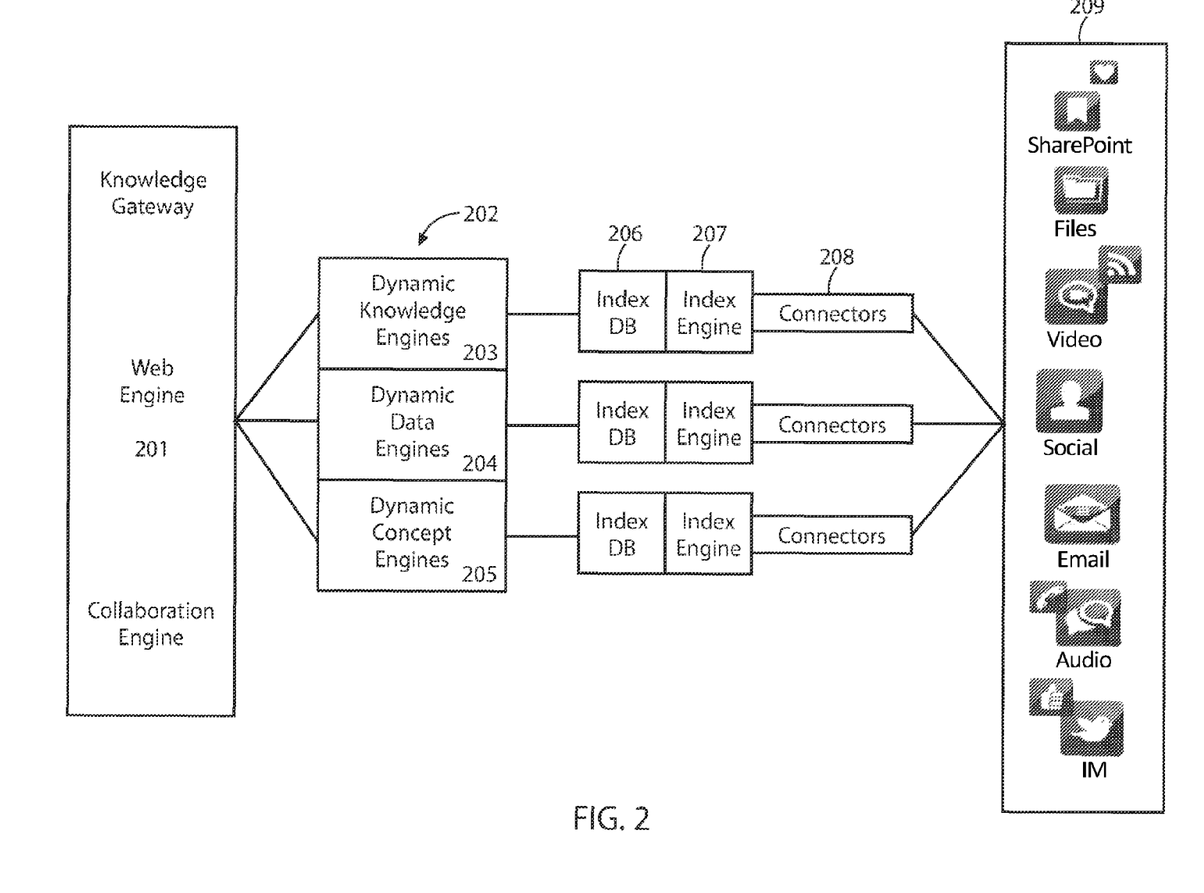
FIG. 2 shows a block diagram of the interactions between dynamic knowledge engines in accordance with the present invention.

Referring to FIG. 2, the web engine 201 drives any number of dynamic engines 202. In the preferred, but nonlimiting, embodiment in FIG. 2, the dynamic engines 202 consist of dynamic knowledge engines 203, dynamic data engines, 204, and dynamic concept engines 205. These dynamic engines 202 are "dynamic" because different subsets of dynamic engines 202 will be utilized depending on the combination of user and function. For example, the social net analysis component 105*n* of the knowledge gateway/UI/admin interface 104 will utilize a different subset of dynamic engines 202 than the Cop/CoI component 105*m*.

The dynamic engines 202 are connected to an index database 206, which is populated by an index engine 207. An index engine 207 is able to interact with a multitude of data sources 209 through connectors 208. The exchange of data may go in both directions. In a "pull" variant, data is retrieved from the multitude of data sources 209 by the index engine 207 through connectors 208 and stored in an index database 206 for further processing by dynamic engines 202. In a "push" variant, the dynamic engines 202 send data to the index database 206, where the index engine 207 sends the data through a connector 208 to one or more of the multitude of data sources 209.

A dynamic knowledge engine 203 is a meaning based engine that takes indexed data from connectors 208 and stores it in an index database 206 for fast processing and retrieval of data. As the knowledge processing component, the dynamic knowledge engine 203 derives a conceptual and contextual understanding of content and automatically processes information from hundreds of different formats. Content, or knowledge, produced by the dynamic knowledge engine 203 feeds the applications and services of the applications/services layer 102.

A dynamic data engine 204 focuses predominately on structured and numeric data finding less obvious relationship between disparate data.

A dynamic concept engine 205 is a concept based technology, which provides the ability to create sets of ideas, no matter how simple or complex, in whatever form or structure is most useful without writing code, regardless of type or source. The technology of the dynamic concept engine 205 allows for natural data consolidation, which drives a unique form of collaboration.

An index engine 207 searches the web, social nets, and all forms of data/objects for relevant links and content. It processes the page content and identifies knowledge for retrieval. The index engine 207 identifies documents from the Internet or Intranet sites, social networks, or data files to be aggregated and indexed into a discovery index to be used by the dynamic knowledge engine 203, the dynamic data engine 204, and the dynamic concept engine 205.

An important aspect of this invention is that it transforms data information into knowledge. The information and data contained in the multitude of data sources 209 exists in many forms and may or may not contain valuable metadata. The transformation of data and information occurs in stages through the dynamic knowledge engines layer 103, which is represented in greater detail in FIG. 2. The index engine 207 performs the search and retrieves the data and information from the multitude of data sources 209. The dynamic engines 202 operate to transform that data and information into knowledge, which is then further integrated by the components of the applications/services layer 102 and the knowledge gateway/UI/admin interface layer 101 into a seamless and coherent presentation to the user.

FIGS. 3-9 show an illustrative, but nonlimiting, embodiment of the method of integrating knowledge engines in a cloud computing environment in accordance with the present invention. In the description of the flowcharts, the functional explanation marked with numerals in angle brackets, <nnn>, will refer to the flowchart blocks bearing that number.

Figure 3:
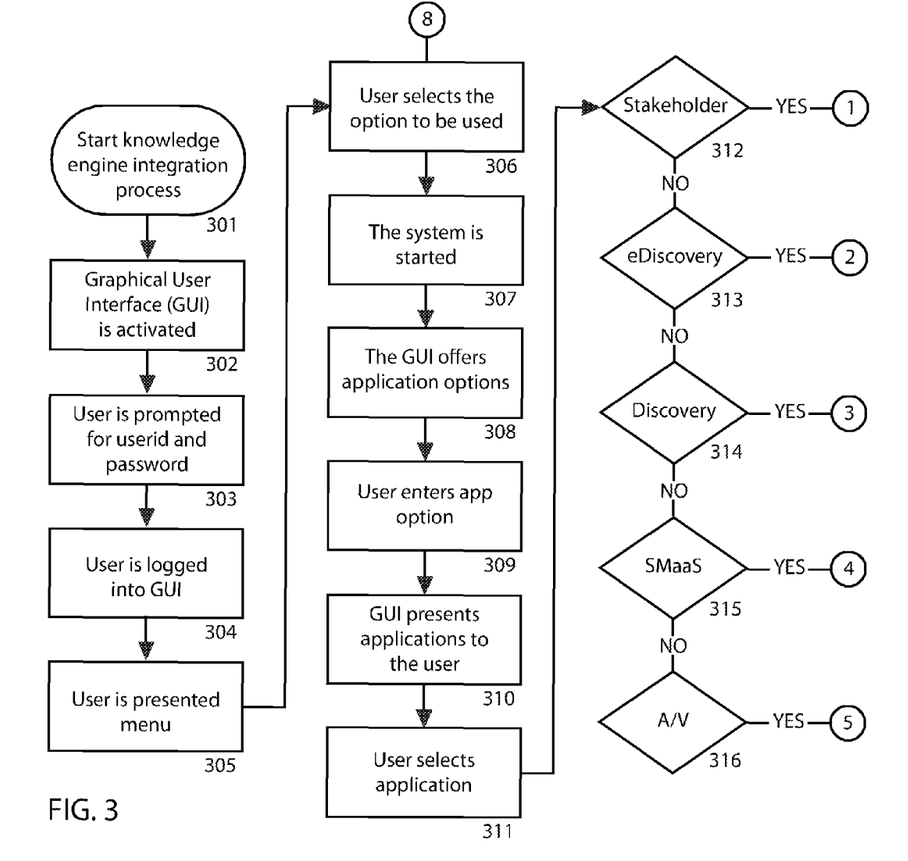
FIG. 3 shows a flow diagram of the method of integrating knowledge engines in a cloud computing environment in accordance with the present invention.

As shown in FIG. 3, the method of integrating knowledge engines starts <301> when the graphical user interface (GUI) is activated <302>. It is assumed that the cloud computing environment has already been started, and the appropriate physical hardware, operating systems, and applications are running. The graphical user interface (GUI) is part of the knowledge gateway/UI/admin interface layer 101. The user is prompted for a user ID and password <303>, and the user is logged into the graphical user interface (GUI) <304> with correct credentials. The graphical user interface (GUI) presents a menu to the user <305>, and the user selects the options to be used <306>. The options to be used in <306> are the multitude of functional components 105 of the knowledge gateway/UI/admin interface layer 101. The knowledge integration system is started <307>, and the graphical user interface (GUI) presents the user with a set of application options <308>. The application options are related to the applications and services of the application/services layer 102. The user enters application options <309> and the graphical user interface (GUI) presents a list of applications to the user <310>. The user selects an application <311> from a list of stakeholder <312>, e-discovery <313>, discovery <314>, systems management as a service (SMaaS) <315>, and audio/visual (A/V) <316>.

Figure 4:
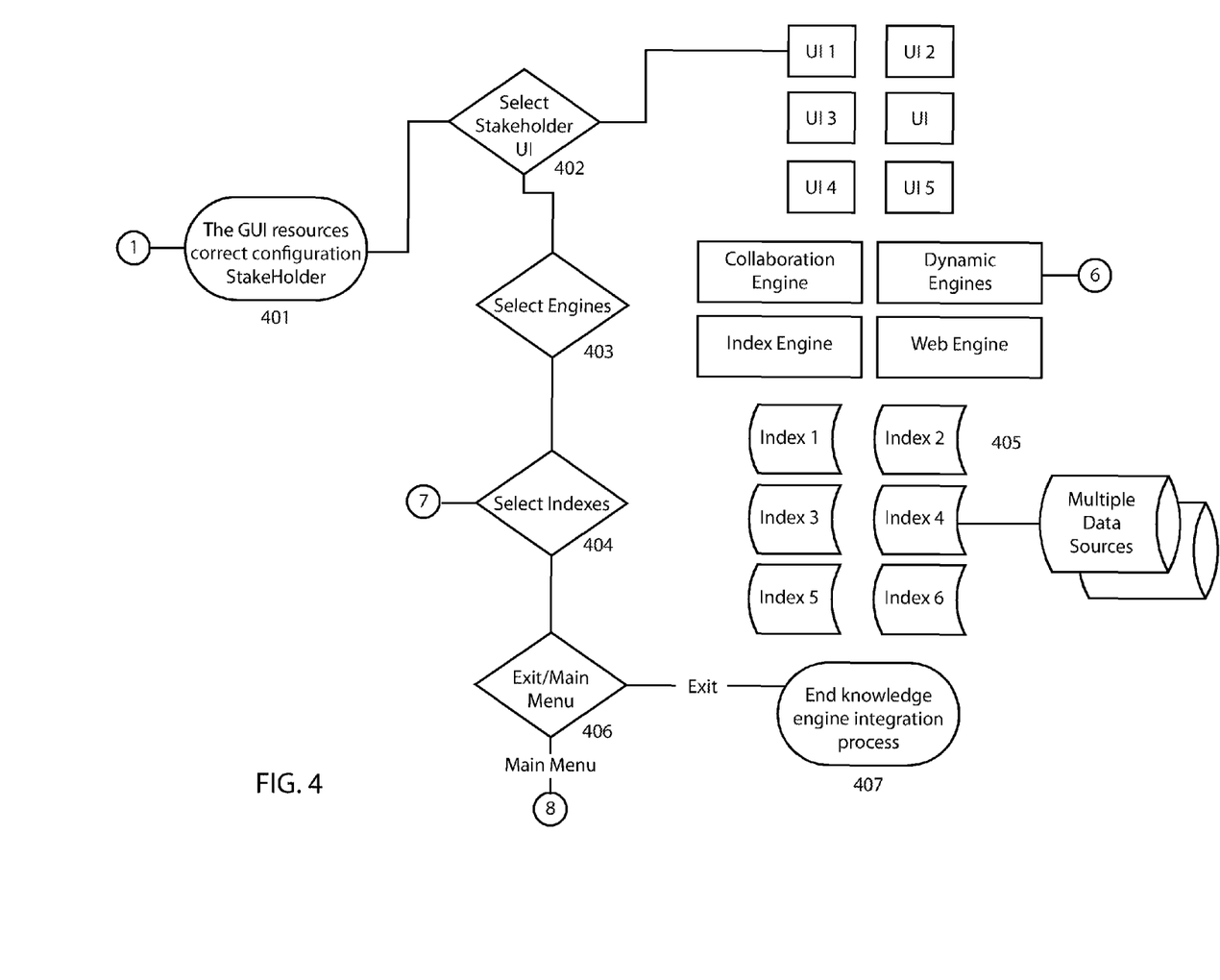
FIG. 4 shows a flow diagram of the stakeholder sub-method in accordance with the present invention.
Figure 9:
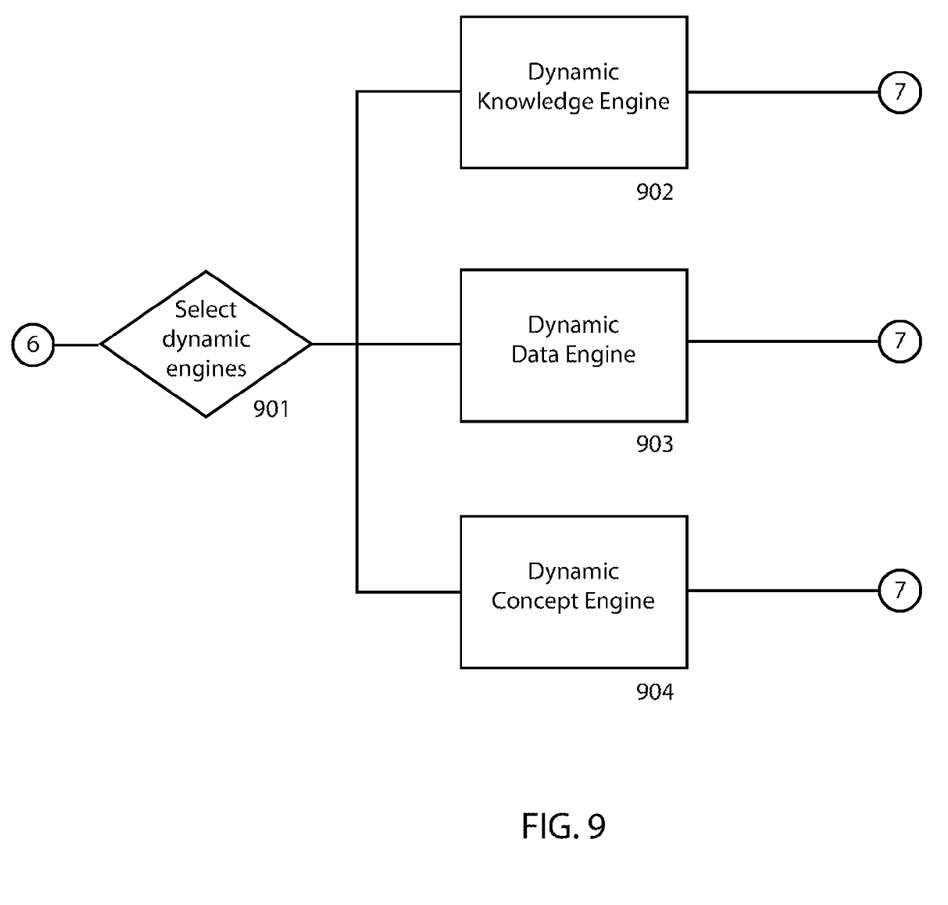
FIG. 9 shows a flow diagram of the dynamic engine selection sub-method in accordance with the present invention.

If the user selects stakeholder <312>, the stakeholder application sub-method is triggered as shown in FIG. 4. The graphical user interface (GUI) resources the correct configuration for the stakeholder application <401>. The user selects the stakeholder user interface <402>. Then the user selects from among the available dynamic engines 202 <403>. This triggers the dynamic engines 202 selection sub-method as shown in FIG. 9, which is described in greater detail below. Once the user has selected dynamic engines 202 <403>, the user selects indexes <404>. The index has at least one index engine 207, at least one index database 206, and at least one connector 208 to the multitude of data sources 209. The user is then given the option <406> of exiting the knowledge engine integration process <407> or returning to the main process step of selecting the option to use <306>.

Figure 5:
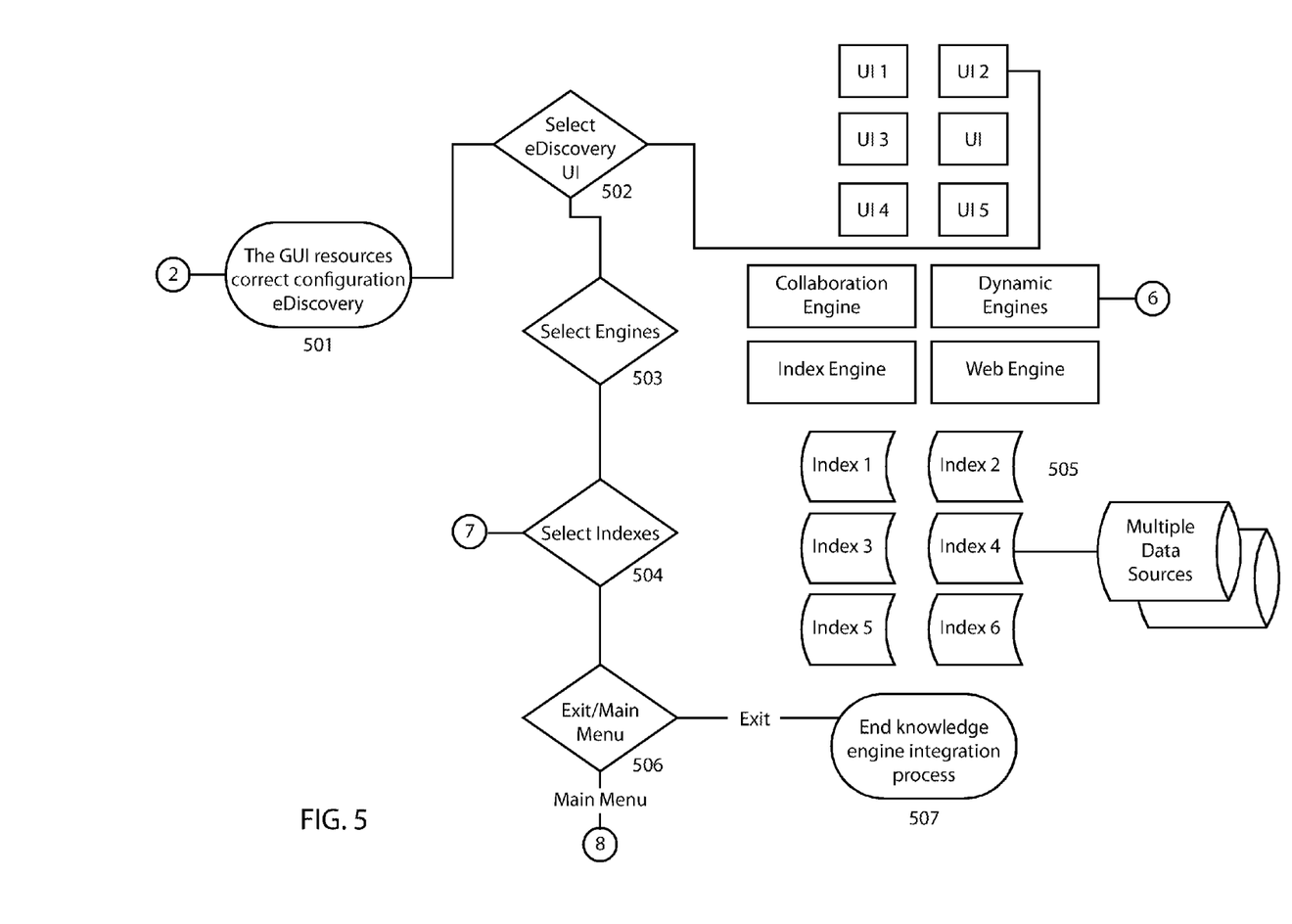
FIG. 5 shows a flow diagram of the discovery sub-method in accordance with the present invention.

If the user selects e-discovery <313>, the e-discovery application sub-method is triggered as shown in FIG. 5. The graphical user interface (GUI) resources the correct configuration for the e-discovery application <501>. The user selects the e-discovery user interface <502>. Then the user selects from among the available dynamic engines 202 <503>. This triggers the dynamic engines 202 selection sub-method as shown in FIG. 9, which is described in greater detail below. Once the user has selected dynamic engines 202 <503>, the user selects indexes <504>. The index has at least one index engine 207, at least one index database 206, and at least one connector 208 to the multitude of data sources 209. The user is then given the option <506> of exiting the knowledge engine integration process <507> or returning to the main process step of selecting the option to use <306>.

Figure 6:
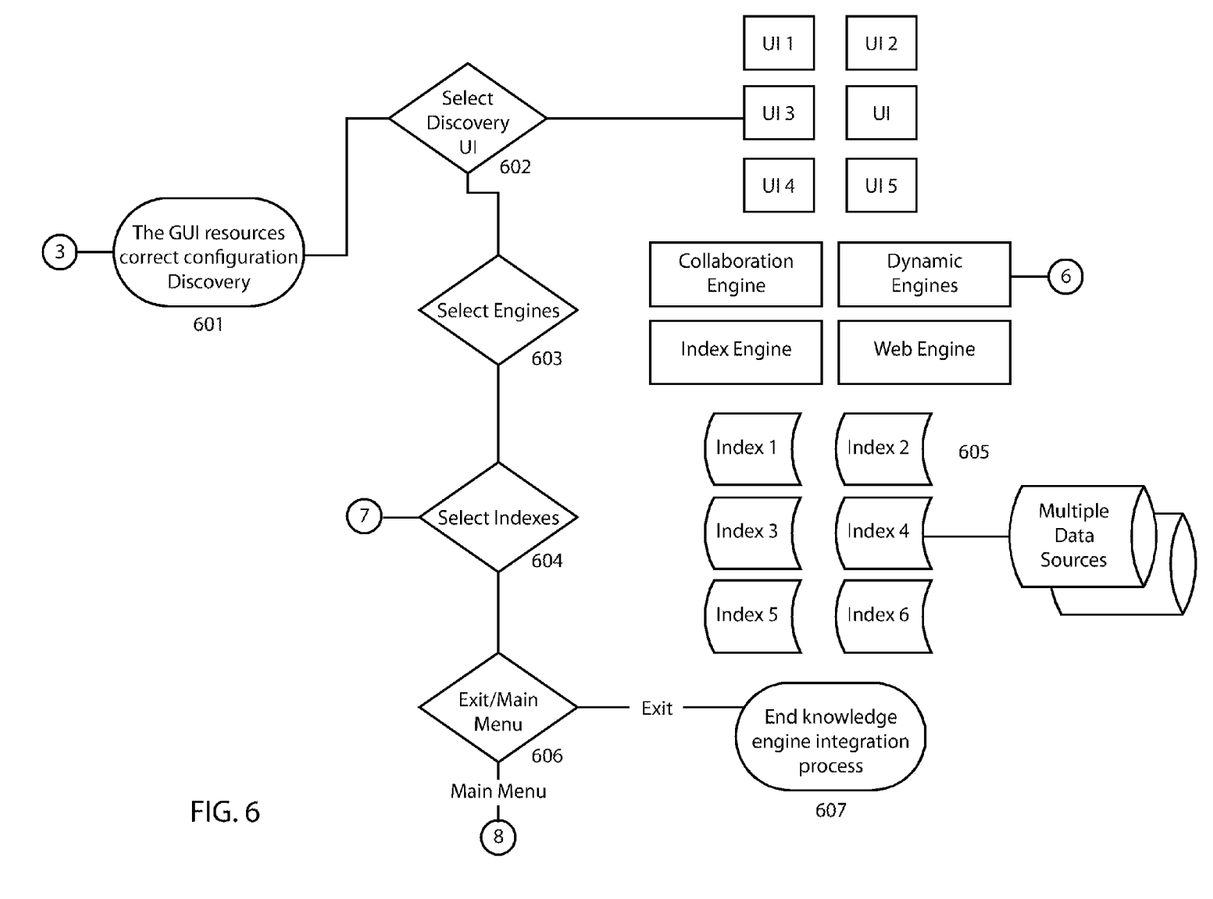
FIG. 6 shows a flow diagram of the e-discovery sub-method in accordance with the present invention.

If the user selects discovery <314>, the discovery application sub-method is triggered as shown in FIG. 6. The graphical user interface (GUI) resources the correct configuration for the discovery application <601>. The user selects the discovery user interface <602>. Then the user selects from among the available dynamic engines 202 <603>. This triggers the dynamic engines 202 selection sub-method as shown in FIG. 9, which is described in greater detail below. Once the user has selected dynamic engines 202 <603>, the user selects indexes <604>. The index has at least one index engine 207, at least one index database 206, and at least one connector 208 to the multitude of data sources 209, which includes an input/output device, e.g., keyboard and mouse, and at least one electronic display. The user is then given the option <606> of exiting the knowledge engine integration process <607> or returning to the main process step of selecting the option to use <306>.

Figure 7:
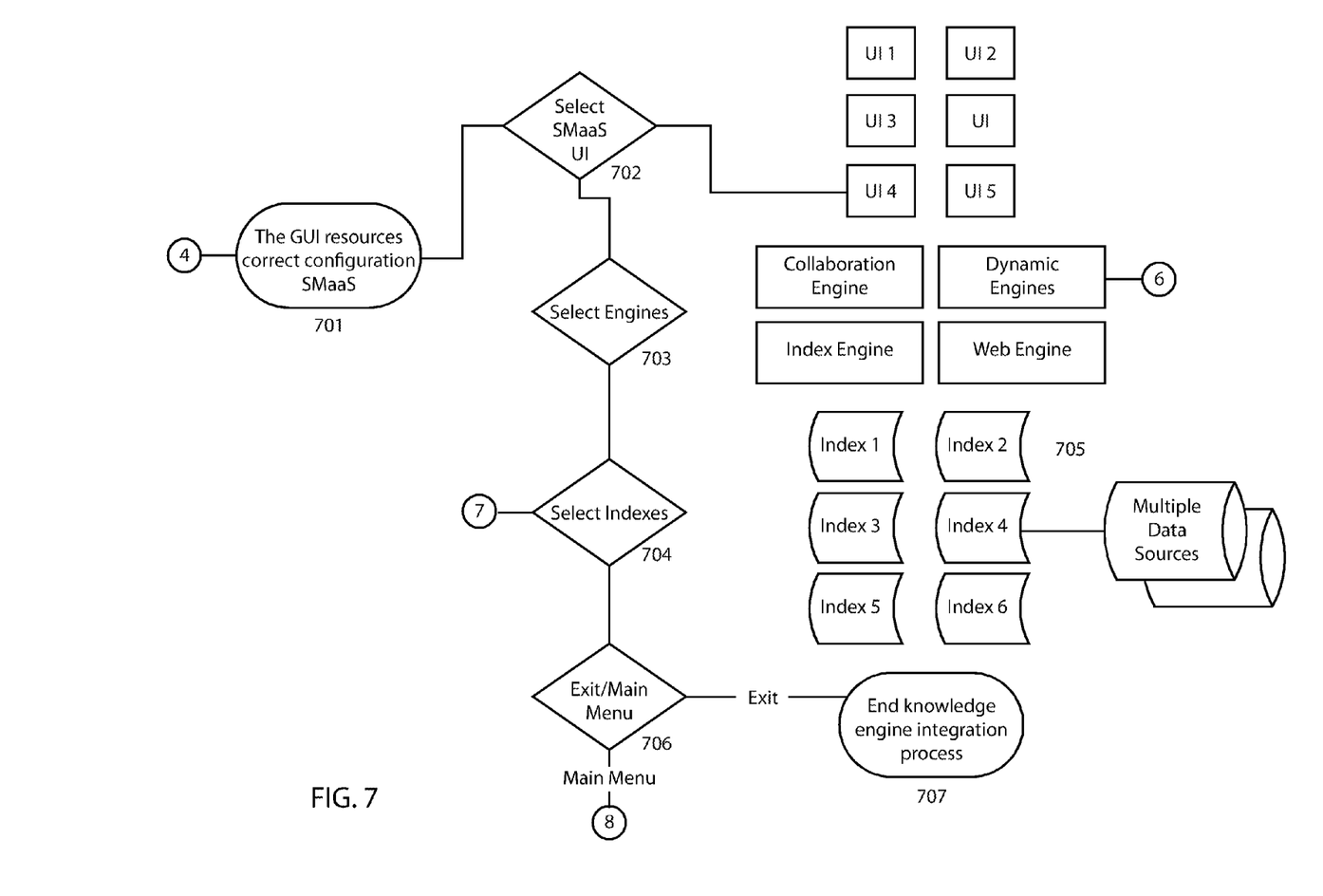
FIG. 7 shows a flow diagram of the SMaaS sub-method in accordance with the present invention.

If the user selects SMaaS <315>, the SMaaS application sub-method is triggered as shown in FIG. 7. The graphical user interface (GUI) resources the correct configuration for the SMaaS application <701>. The user selects the SMaaS user interface <702>. Then the user selects from among the available dynamic engines 202 <703>. This triggers the dynamic engines selection sub-method as shown in FIG. 9, which is described in greater detail below. Once the user has selected dynamic engines 202 <703>, the user selects indexes <704>. The index has at least one index engine 207, at least one index database 206, and at least one connector 208 to the multitude of data sources 209. The user is then given the option <706> of exiting the knowledge engine integration process <707> or returning to the main process step of selecting the option to use <306>.

Figure 8:
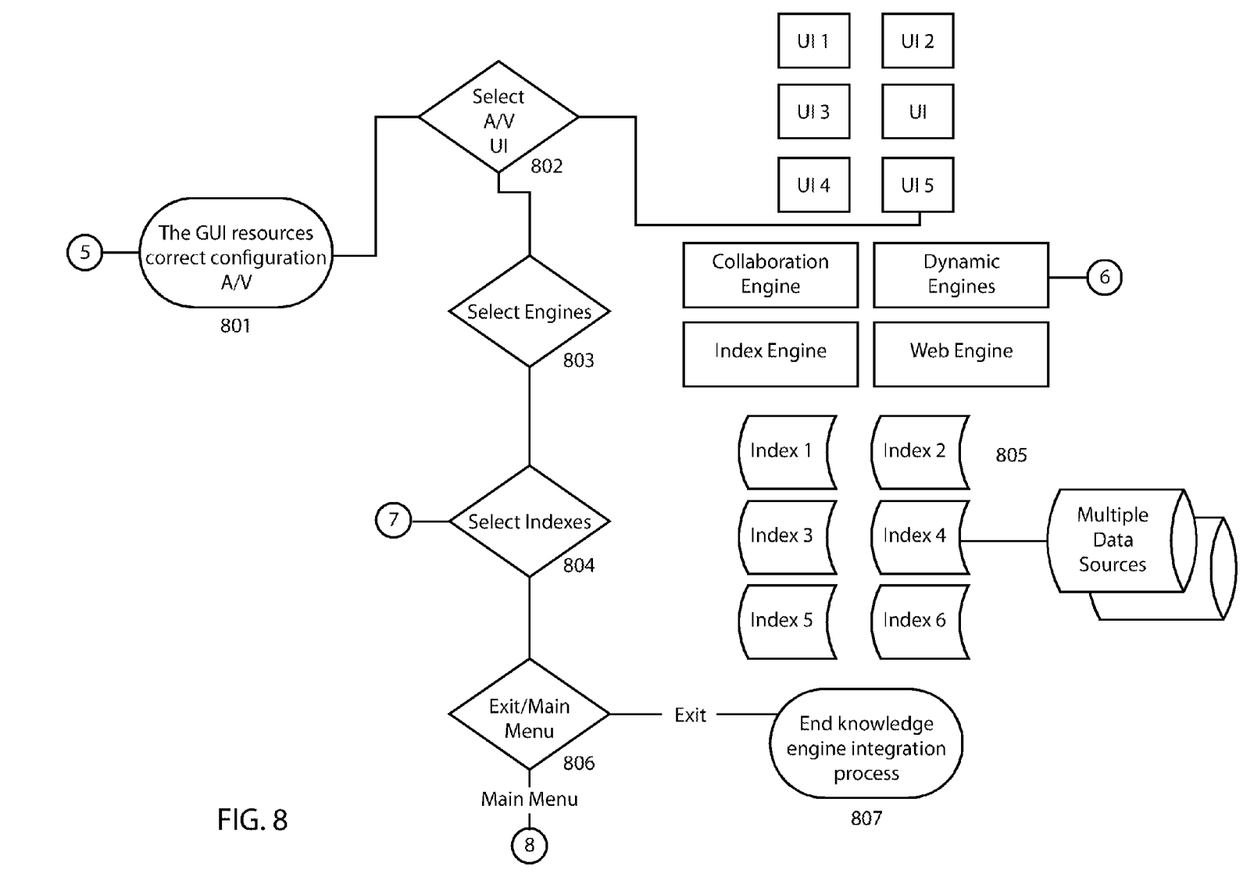
FIG. 8 shows a flow diagram of the A/V sub-method in accordance with the present invention.

If the user selects A/V <312>, the A/V application sub-method is triggered as shown in FIG. 8. The graphical user interface (GUI) resources the correct configuration for the A/V application <801>. The user selects the A/V user interface <802>. Then the user selects from among the available dynamic engines 202 <803>. This triggers the dynamic engines 202 selection sub-method as shown in FIG. 9, which is described in greater detail below. Once the user has selected dynamic engines 202 <803>, the user selects indexes <804>. The index has at least one index engine 207, at least one index database 206, and at least one connector 208 to the multitude of data sources 209. The user is then given the option <806> of exiting the knowledge engine integration process <807> or returning to the main process step of selecting the option to use <306>.

The dynamic engines 202 selection sub-method is shown in FIG. 9. The user selects <901> from among the dynamic knowledge engine 203 <902>, the dynamic data engine 204 <903>, and the dynamic concept engine 205 <904>. Once the selection has been made, the method returns to the select indexes step <404>, <504>, <604>, <704>, or <804> of the appropriate application sub-method.

An important, but nonlimiting, aspect of this invention is that the method of integrating knowledge engines and the knowledge engine integration system 100 are not dependent on any particular hardware or software. Particular embodiments of the dynamic engines, for example, can be modified or replaced at any time. The method of integrating knowledge engines and the knowledge engine integration system 100 are intended to be coupled with a cloud computing platform. A cloud computing platform has all the servers, network connections, power supply, operating system, and other hardware and software components necessary to run a cloud computing environment.

The knowledge engine integration system could operate on any cloud platform, to include a transportable private cloud computing platform. The dynamic engines 202, index databases 206, index engines 207, and/or connectors 208 may be hosted on a platform other than the cloud computing platform of the system for integrating knowledge engines. For example, the index databases 206 could be hosted in a data warehouse separate and distinct from the cloud computing platform of the system for integrating knowledge engines.

The knowledge engine integration system is also not dependent on network connectivity to operate. As the knowledge engine integration system operates, files and data are stored in the index databases 206. The size of the index databases 206 may vary widely, and they could be very large data stores. If network connectivity is lost, the knowledge engine integration system can continue to function by pulling data from and pushing data to the index databases 206.

The knowledge integration system is a fully integrated hardware and software discovery system with an automated interface to assist in the execution of search and discovery by integrating multiple software appliances and applications. This includes an entire suite of hardware, software tools, and user interface necessary for a comprehensive collaborative knowledge search and discovery environment. This invention will provide a search and discovery environment designed to discover content from all types of data and digital media including structured, semi-structured, and unstructured data, as well as actual content of audio and video media. The invention will offer the ability to index and search all types of digital data sources including HTTP, social media, rich media, and numerous other data sources.

Furthermore, it should be understood that when introducing elements of the present invention in the claims or in the above description of the preferred embodiment of the invention, the terms "have," "having," "includes" and "including" and similar terms as used in the foregoing specification are used in the sense of "optional" or "may include" and not as "required." Similarly, the term "portion" should be construed as meaning some or all of the item or element that it qualifies.

Thus, there have been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. A system for integrating knowledge engines in a cloud computing environment, the system comprising:
   at least one processor;
   a cloud computing platform for hosting knowledge engines and integration software, wherein the cloud computing platform resides on the at least one processor;
   a graphical user interface, hosted on the cloud computing platform, for interfacing with a user through at least one input/output device and an electronic display;
   a plurality of applications, hosted on the cloud computing platform and accessible through the graphical user interface, for integrating output from knowledge engines;
   at least one knowledge engine, interfaced with the plurality of applications, for extracting knowledge from data and information;
   at least one index database, accessible by the at least one knowledge engine, for storing indexing information;
   at least one index engine, interfaced with the at least one index database, for retrieving and indexing data and information from a plurality of data sources; and
   at least one connector per each index engine, for transferring data and information between the at least one index engine and the plurality of data sources.

2. The system for integrating knowledge engines in a cloud computing environment in accordance with claim 1, wherein the cloud computing platform is a transportable private cloud computing platform.

3. The system for integrating knowledge engines in a cloud computing environment in accordance with claim 1, wherein the at least one knowledge engine is a dynamic knowledge engine.

4. The system for integrating knowledge engines in a cloud computing environment in accordance with claim 3, wherein the dynamic knowledge engine is selected from the group consisting of a collaboration engine, a web engine, a discovery engine, or an index engine.

5. The system for integrating knowledge engines in a cloud computing environment in accordance with claim 1, wherein the at least one knowledge engine is a dynamic data engine.

6. The system for integrating knowledge engines in a cloud computing environment in accordance with claim 1, wherein the at least one knowledge engine is a dynamic concept engine.

7. The system for integrating knowledge engines in a cloud computing environment in accordance with claim 1, wherein data and information are pushed out to the plurality of data sources.

8. The system for integrating knowledge engines in a cloud computing environment in accordance with claim 1, wherein the system for integrating knowledge engines continues to function in the event of a loss of network connectivity by utilizing the index databases to store and retrieve data and information.

9. The system for integrating knowledge engines in a cloud computing environment in accordance with claim 1, wherein the at least one knowledge engine, the at least one index database, the at least one index engine, or the at least one connector per each index engine is not hosted on the cloud computing platform of the system for integrating knowledge engines.

10. The system for integrating knowledge engines in a cloud computing environment in accordance with claim 1, wherein the plurality of applications is selected from the group consisting of alerting, channels, information retrieval, agents, clustering, summarization, media index and search, xml tagging, taxonomy generation, collaboration, profiling, hyperlinking, e-discovery, and categorization.

11. A method of integrating knowledge engines in a cloud computing environment, the method comprising the steps of:
   activating a graphical user interface (GUI) for a knowledge integration system, wherein the graphical user interface (GUI) is hosted on a cloud computing platform residing on at least one processor;
   presenting a set of knowledge integration system options to the user;
   selecting knowledge integration system options;
   starting the knowledge integration system;
   presenting a set of application options to the user;
   selecting the application from the set of application options;
   resourcing a configuration of software sufficient to run the selected application;
   selecting an appropriate user interface for the selected application;
   selecting at least one dynamic engine appropriate for the selected application; and
   selecting an index, wherein the index is comprised of at least one index engine, at least one index database, and at least one connector per each index engine, appropriate for the selected application.

12. The method of integrating knowledge engines in a cloud computing environment in accordance with claim 11, wherein the user is required to authenticate with the graphical user interface (GUI).

13. The method of integrating knowledge engines in a cloud computing environment in accordance with claim 11, wherein the cloud computing platform is a transportable private cloud computing platform.

14. The method of integrating knowledge engines in a cloud computing environment in accordance with claim 13, wherein the transportable private cloud computing platform is initialized.

15. The method of integrating knowledge engines in a cloud computing environment in accordance with claim 13, wherein software applications are migrated to the transportable private cloud computing platform.

16. The method of integrating knowledge engines in a cloud computing environment in accordance with claim 14, wherein software applications are migrated to the transportable private cloud computing platform.

17. The method of integrating knowledge engines in a cloud computing environment in accordance with claim 11, wherein the step of presenting a set of application options to the user includes selecting from the group consisting of alerting, channels, information retrieval, agents, clustering, summarization, media index and search, xml tagging, taxonomy generation, collaboration, profiling, hyperlinking, e-discovery, and categorization.

18. The method for integrating knowledge engines in a cloud computing environment in accordance with claim 11, wherein the step of selecting at least one dynamic engine appropriate for the selected application includes selecting at least one dynamic knowledge engine.

19. The method for integrating knowledge engines in a cloud computing environment in accordance with claim 11, wherein the step of selecting at least one dynamic engine appropriate for the selected application includes selecting at least one dynamic data engine.

20. The method for integrating knowledge engines in a cloud computing environment in accordance with claim 11, wherein the step of selecting at least one dynamic engine appropriate for the selected application includes selecting at least one dynamic concept engine.

* * * * *